United States Patent
Cruz

Patent Number: 6,115,651
Date of Patent: Sep. 5, 2000

[54] LARGE VEHICLE BLINDSPOT MONITOR

[76] Inventor: Diogenes J. Cruz, 133-65 242nd St., Rosedale, N.Y. 11422

[21] Appl. No.: 09/007,415

[22] Filed: Jan. 15, 1998

[51] Int. Cl.[7] .............................. G06F 17/00; G05D 1/00
[52] U.S. Cl. ................................ 701/1; 701/301; 701/28; 340/435; 340/436; 340/901; 340/903; 348/143; 348/152; 348/155; 348/159; 342/66; 342/70
[58] Field of Search .................................. 701/1, 93, 301, 701/117, 119, 23, 28; 342/66, 104, 70, 71; 340/936, 937, 903, 435, 436, 901, 904; 348/143, 148, 118, 116, 151, 152, 153, 154, 155, 159; 382/100, 104

[56] References Cited

U.S. PATENT DOCUMENTS

| | | | |
|---|---|---|---|
| 4,260,980 | 4/1981 | Bates | 342/32 |
| 5,210,521 | 5/1993 | Hojell et al. | 340/436 |
| 5,325,096 | 6/1994 | Pakett | 342/70 |
| 5,400,244 | 3/1995 | Watanabe et al. | 701/301 |
| 5,473,364 | 12/1995 | Burt | 348/47 |
| 5,517,196 | 5/1996 | Pakett et al. | 342/70 |
| 5,535,144 | 7/1996 | Kise | 701/301 |
| 5,574,443 | 11/1996 | Hsieh | 340/901 |
| 5,578,983 | 11/1996 | Inwood et al. | 340/438 B |
| 5,633,705 | 5/1997 | Asayama | 356/3.14 |
| 5,646,612 | 7/1997 | Byon | 340/903 |
| 5,646,614 | 7/1997 | Abersfelder et al. | 340/932.2 |
| 5,680,123 | 10/1997 | Lee | 340/937 |
| 5,706,107 | 1/1998 | Smith | 359/15 |
| 5,734,336 | 3/1998 | Smithline | 340/903 |
| 5,912,822 | 6/1999 | Davis et al. | 701/119 |
| 5,935,190 | 8/1999 | Davis et al. | 701/119 |
| 5,949,331 | 9/1999 | Schofield et al. | 340/461 |
| 5,959,555 | 9/1999 | Furuta | 340/937 |
| 5,963,127 | 10/1999 | Lang et al. | 340/346 |

*Primary Examiner*—Jacques H. Louis-Jacques

[57] ABSTRACT

A large vehicle blind spot monitor is provided including a vehicle having a rear face, a front face, and an interior driver compartment with a steering wheel and dashboard. At least one camera unit includes a camera for generating a real time continues video image only during the actuation thereof. Associated therewith is a detector for generating an activation signal only upon the detection of a person. At least one screen is mounted to the dash of the vehicle and connected to the camera unit for displaying the video image upon the receipt thereof. An alarm is provided for generating an alarm upon the receipt of the activation signal. Finally, a control mechanism is adapted to transmit the activation signal to the alarm upon the receipt thereof and further actuate each camera unit only upon the receipt of the activation signal from the camera unit thus allowing a driver to view a blindspot.

2 Claims, 3 Drawing Sheets

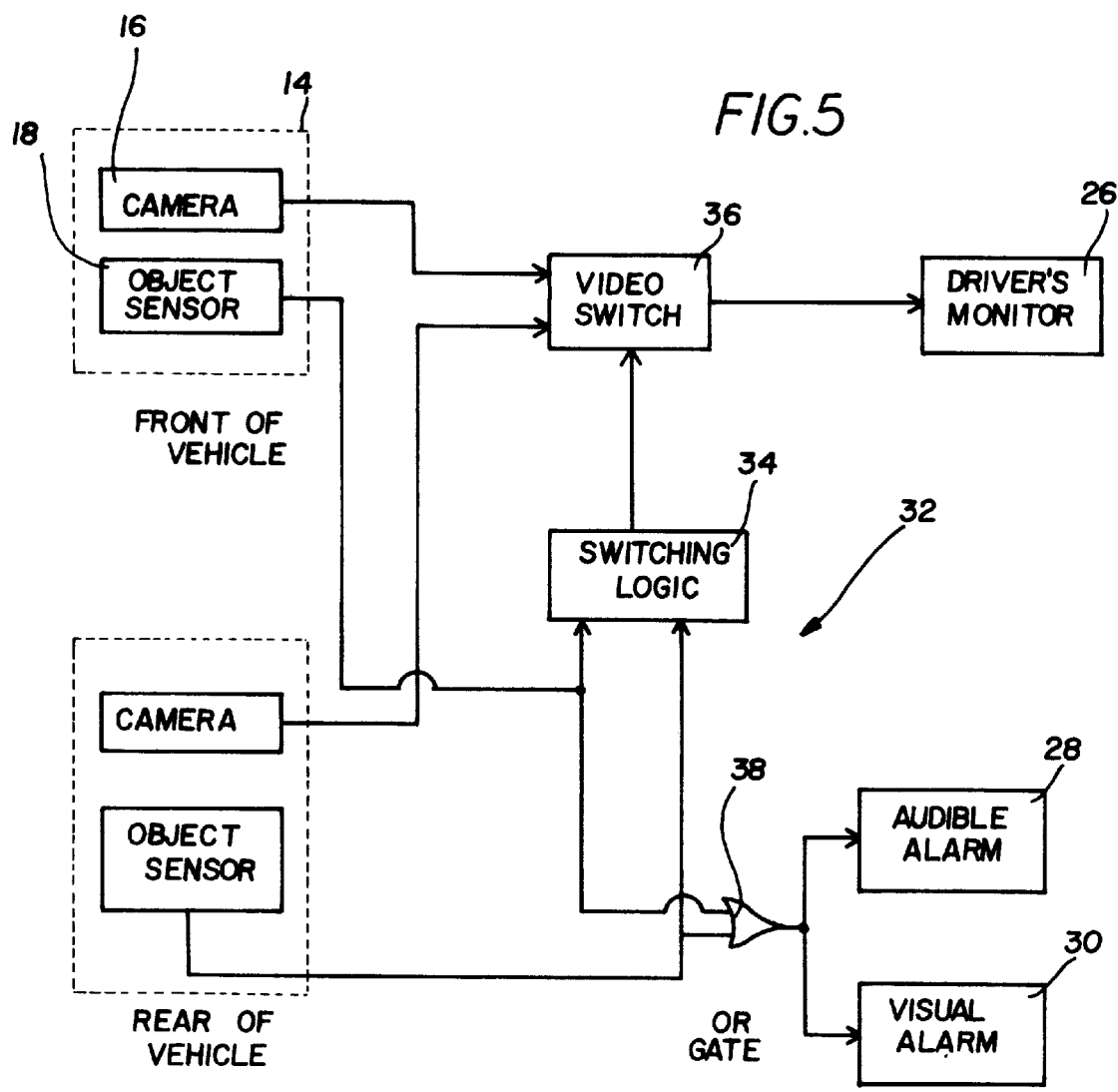

LARGE VEHICLE BLINDSPOT MONITOR

BACKGROUND OF THE INVENTION

1. Field of the Invention

The present invention relates to blindspot cameras and more particularly pertains to a new large vehicle blindspot monitor for alerting a driver of a person being in a blindspot and further permitting the viewing of the person.

2. Description of the Prior Art

The use of blindspot cameras is known in the prior art. More specifically, blindspot cameras heretofore devised and utilized are known to consist basically of familiar, expected and obvious structural configurations, notwithstanding the myriad of designs encompassed by the crowded prior art which have been developed for the fulfillment of countless objectives and requirements.

Known prior art blindspot cameras include U.S. Pat. Nos. 5,424,952; 5,325,096; 4,260,980; 5,008,678; U.S. Patent Des. 302,966; and U.S. Pat. No. 4,968,124.

In these respects, the large vehicle blindspot monitor according to the present invention substantially departs from the conventional concepts and designs of the prior art, and in so doing provides an apparatus primarily developed for the purpose of alerting a driver of a person being in a blindspot and further permitting the viewing of the person.

SUMMARY OF THE INVENTION

In view of the foregoing disadvantages inherent in the known types of blindspot cameras now present in the prior art, the present invention provides a new large vehicle blindspot monitor construction wherein the same can be utilized for alerting a driver of a person being in a blindspot and further permitting the viewing of the person.

The general purpose of the present invention, which will be described subsequently in greater detail, is to provide a new large vehicle blindspot monitor apparatus and method which has many of the advantages of the blindspot cameras mentioned heretofore and many novel features that result in a new large vehicle blindspot monitor which is not anticipated, rendered obvious, suggested, or even implied by any of the prior art blindspot cameras, either alone or in any combination thereof.

To attain this, the present invention generally comprises a large vehicle having a rear face, a front face, and an interior driver compartment with a steering wheel and dashboard; a pair of camera units each including a wide angle camera for generating a real time continues video image only during the actuation thereof, a heat sensor for generating an activation signal upon the detection of a temperature greater than a predetermined amount, a sound detector for generating the activation signal upon the detection of a sound with a magnitude greater than a predetermined amount, and a motion detector for generating the activation signal only upon the detection of motion; said pair of cameras units including a front camera unit mounted to a top edge of the front face of the large vehicle and directed forwardly and downwardly and a rear camera unit mounted to a top edge of the rear face of the large vehicle and directed rearwardly and downwardly; a pair of screens mounted to the dash of the large vehicle in a side-by-side relationship, each screen connected to an associated one of the camera units for displaying the video image upon the receipt thereof; an audible alarm situated on the dash of the large vehicle for emitting an audible sound upon the receipt of the activation signal; a visual alarm situated on the dash of the large vehicle adjacent the screens for providing a visual alarm upon the receipt of the activation signal; and control means connected between the camera units, screens, audible alarm and visual alarm, the control means adapted to transmit the activation signal to the audible and visual alarms upon the receipt thereof and further actuate each camera unit only upon the receipt of the activation signal from the corresponding camera unit thus allowing driver to view blindspots to the front and rear of the large vehicle.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new large vehicle blindspot monitor apparatus and method which has many of the advantages of the blindspot cameras mentioned heretofore and many novel features that result in a new large vehicle blindspot monitor which is not anticipated, rendered obvious, suggested, or even implied by any of the prior art blindspot cameras, either alone or in any combination thereof.

It is another object of the present invention to provide a new large vehicle blindspot monitor which may be easily and efficiently manufactured and marketed.

It is a further object of the present invention to provide a new large vehicle blindspot monitor which is of a durable and reliable construction.

An even further object of the present invention is to provide a new large vehicle blindspot monitor which is susceptible of a low cost of manufacture with regard to both materials and labor, and which accordingly is then susceptible of low prices of sale to the consuming public, thereby making such large vehicle blindspot monitor economically available to the buying public.

Still yet another object of the present invention is to provide a new large vehicle blindspot monitor which provides in the apparatuses and methods of the prior art some of the advantages thereof, while simultaneously overcoming some of the disadvantages normally associated therewith.

Still another object of the present invention is to provide a new large vehicle blindspot monitor for alerting a driver of a person being in a blindspot and further permitting the viewing of the person.

Even still another object of the present invention is to provide a new large vehicle blindspot monitor that includes a vehicle having a rear face, a front face, and an interior driver compartment with a steering wheel and dashboard. At least one camera unit includes a camera for generating a real time continues video image only during the actuation thereof. Associated therewith is a detector for generating an activation signal only upon the detection of a person. At least one screen is mounted to the dash of the vehicle and connected to the camera unit for displaying the video image upon the receipt thereof. An alarm is provided for generating an alarm upon the receipt of the activation signal. Finally, a control mechanism is adapted to transmit the activation signal to the alarm upon the receipt thereof and further actuate each camera unit only upon the receipt of the activation signal from the camera unit thus allowing a driver to view a blindspot.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 5 is a schematic diagram of the present invention.

DESCRIPTION OF THE PREFERRED EMBODIMENT

Figure 1:
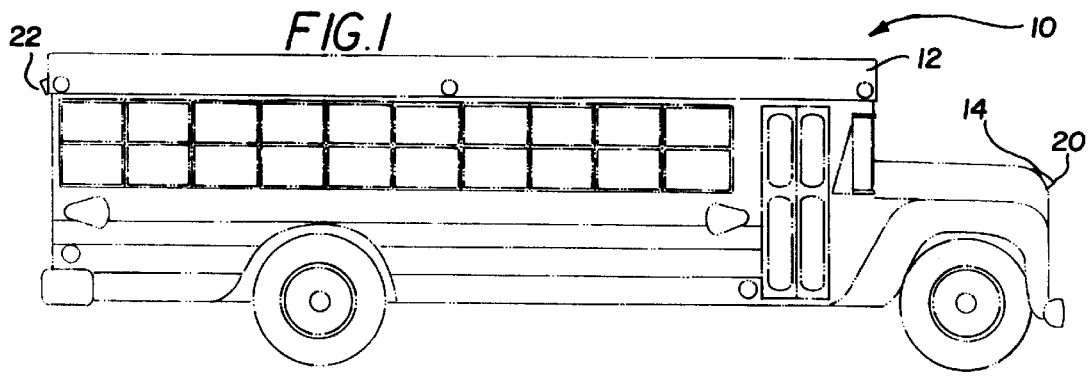
FIG. 1 is a side view of a new large vehicle blindspot monitor according to the present invention.

With reference now to the drawings, and in particular to FIGS. 1 through 5 thereof, a new large vehicle blindspot monitor embodying the principles and concepts of the present invention and generally designated by the reference numeral 10 will be described.

The present invention, as designated as numeral 10, includes a large vehicle 12 such as a bus or truck. Such vehicle has a rear face, a front face, and an interior driver compartment with a steering wheel and dashboard. Note FIG. 4.

Figure 2:
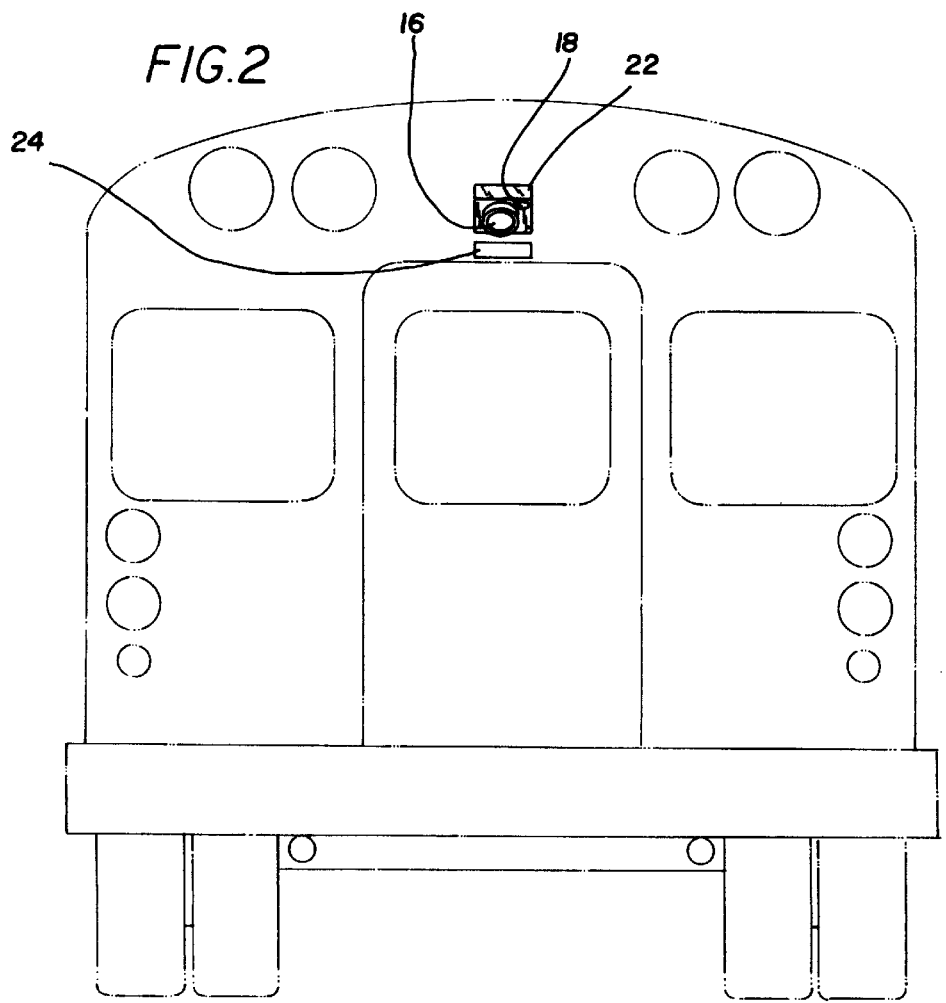
FIG. 2 is a rear view of the present invention.
Figure 3:
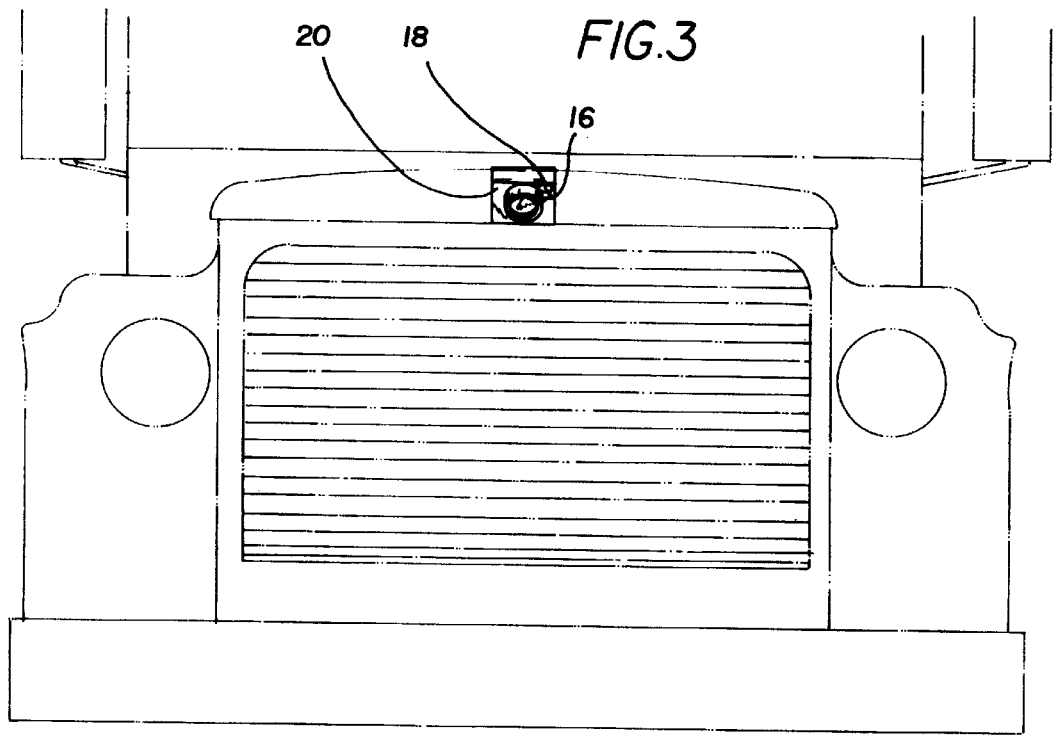
FIG. 3 is a front view of the present invention.

FIGS. 1–3 show a pair of camera units 14 each including a wide angle camera 16. Such camera is adapted for generating a real time continues video image of objects in front of it only during the actuation thereof.

Associated therewith is an object sensor 18 including a plurality of various sensors for detecting a person or other entity in a blindspot of the driver. Such sensors include a heat sensor for generating an activation signal upon the detection of a temperature greater than a predetermined amount. The foregoing temperature is preferably that associated with a human being. Further provided is a sound detector for generating the activation signal upon the detection of a sound with a magnitude greater than a predetermined amount. The generating of the activation signal may further be dependent on the frequency range of the sound. For example, incoming sound may be filtered to include only frequency ranges including the speech of children. Finally, a motion detector is provided for generating the activation signal only upon the detection of motion. Preferably, each of the foregoing sensors is directed downwardly so as not to detect entities past a predetermined distance from the vehicle.

The pair of cameras units include a front camera unit 20 mounted to a top edge of the front face of the large vehicle. The camera of the front camera unit is directed straight forwardly and downwardly. The camera units further include a rear camera unit 22 mounted to a top edge of the rear face of the large vehicle and directed straight rearwardly and downwardly. In the preferred embodiment, each camera unit is further equipped with a light 24 that is adapted to illuminate with the actuation of the corresponding camera only during the absence of ambient light. This may be accomplished by way of a light sensing switch or the like.

Figure 4:
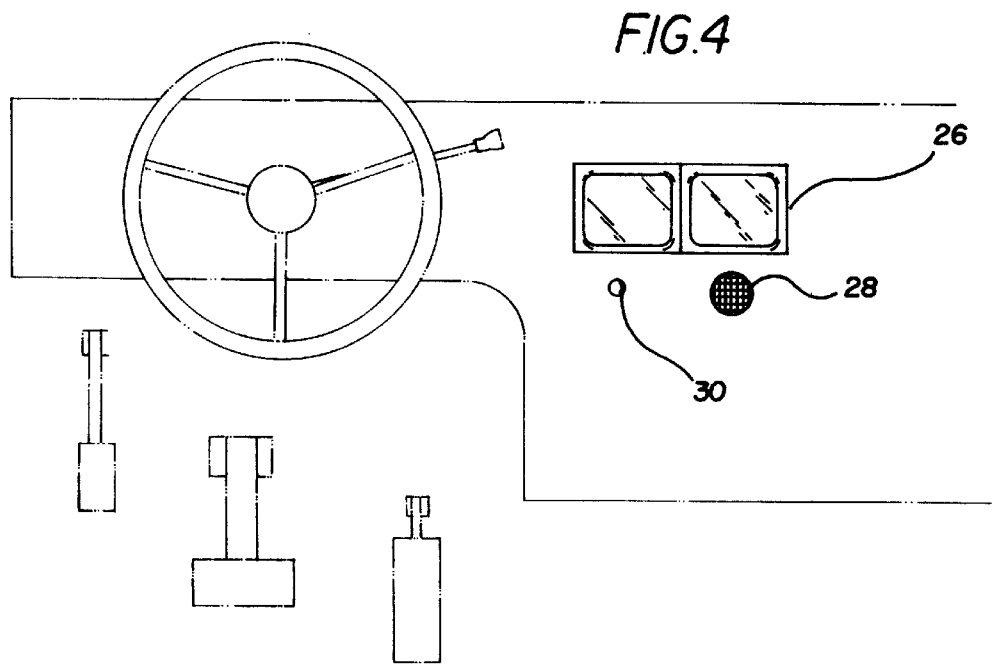
FIG. 4 is a front view of the dashboard of the vehicle of the present invention.

FIG. 4 depicts a pair of video screens 26 mounted to the dash of the large vehicle in a side-by-side relationship. Each screen is connected to an associated one of the camera units for displaying the video image only upon the receipt thereof.

For purposes that will soon become apparent, an audible alarm 28 is situated on the dash of the large vehicle for emitting an audible sound upon the receipt of the activation signal. Mounted adjacent the audio alarm is a visual alarm 30 adjacent the screens. During operation, the visual alarm serves for providing a visual alarm upon the receipt of the activation signal. This visual alarm preferably takes the form of a flashing light or the like.

Finally, a control means 32 is connected between the camera units, screens, audible alarm and visual alarm. The control means is adapted to transmit the activation signal to the audible and visual alarms upon the receipt thereof. The control means further actuates each camera unit only upon the receipt of the activation signal from the corresponding camera unit. As such, a driver is allowed to view blindspots to the front and rear of the large vehicle when a person is detected in the blindspot.

As shown in FIG. 5, the control means preferably comprises switching logic 34 connected to a video switch 36. The switching logic is connected to the object sensors while the video switch is connected between the cameras and the screens. In the preferred embodiment, the switching logic governs the video switch to accomplish the function of the control means. In an alternate embodiment, however, when only one screen is employed, the switching logic is adapted to allow the transmission of the video image to the screen from only the camera of the camera unit that detects a person. The switching logic is further adapted to accommodate situations wherein both camera units detect motion by governing the video switch to effect split screens and/or toggling between the camera units depending on the preference of the user. With reference still to FIG. 5, it is shown that an OR-gate 38 is connected between the object sensors and the alarms. The OR-gate functions to ensure that the alarms are actuated when either one of the object sensors detects a person.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A large vehicle blind spot monitor comprising, in combination:

a large vehicle having a rear face, a front face, and an interior driver compartment with a steering wheel and dash;

a pair of camera units each including a wide angle camera for generating a real time continuous video image only during the actuation thereof, a heat sensor for generating an activation signal upon the detection of a temperature greater than a predetermined amount, a sound detector for generating the activation signal upon the detection of a sound with a magnitude greater than a predetermined amount, and a motion detector for generating the activation signal only upon the detection of motion;

said pair of cameras units including a front camera unit mounted to a top edge of the front face of the large vehicle and directed forwardly and downwardly and a rear camera unit mounted to a top edge of the rear face of the large vehicle and directed rearwardly and downwardly;

a pair of screens mounted to the dash of the large vehicle in a side-by-side relationship, each screen connected to an associated one of the camera units for displaying the video image upon the receipt thereof;

an audible alarm situated on the dash of the large vehicle for emitting an audible sound upon the receipt of the activation signal;

a visual alarm situated on the dash of the large vehicle adjacent the screens for providing a visual alarm upon the receipt of the activation signal; and control means connected between the camera units, screens, audible alarm and visual alarm, the control means adapted to transmit the activation signal to the audible and visual alarms upon the receipt thereof and further actuate each camera unit only upon the receipt of the activation signal from the corresponding camera unit thus allowing a driver to view blind spots to the front and rear of the large vehicle.

2. A vehicle blind spot monitor comprising:

a vehicle having a rear face, a front face, and an interior driver compartment with a dash;

a pair of camera units each including a wide angle camera for generating a real time continuous video image during the actuation thereof, a heat sensor for generating an activation signal upon the detection of a temperature greater than a predetermined amount, a sound detector for generating the activation signal upon the detection of a sound with a magnitude greater than a predetermined amount, and a motion detector for generating the activation signal only upon the detection of motion;

said pair of cameras units including a front camera unit mounted to a top edge of the front face of the vehicle and directed forwardly and downwardly, and a rear camera unit mounted to a top edge of the rear face of the vehicle and directed rearwardly and downwardly;

a pair of screens mounted to the dash of the large vehicle in a side-by-side relationship, each screen connected to an associated one of the camera units for displaying the video image upon the receipt thereof;

an audible alarm situated on the dash of the vehicle for emitting an audible sound upon the receipt of the activation signal;

a visual alarm situated on the dash of the vehicle adjacent the screens for providing a visual alarm upon the receipt of the activation signal; and control means connected between the camera units, screens, audible alarm and visual alarm, the control means adapted to transmit the activation signal to the audible and visual alarms upon the receipt of the activation signal and further actuate each camera unit upon the receipt of the activation signal from the corresponding camera unit thus allowing a driver to view blind spots to the front and rear of the vehicle.

* * * * *